April 11, 1961  J. McCAMBRIDGE  2,979,165
FLUID-DYNAMIC EMERGENCY BRAKES
Filed April 7, 1960  2 Sheets-Sheet 1

April 11, 1961   J. McCAMBRIDGE   2,979,165
FLUID-DYNAMIC EMERGENCY BRAKES
Filed April 7, 1960   2 Sheets-Sheet 2
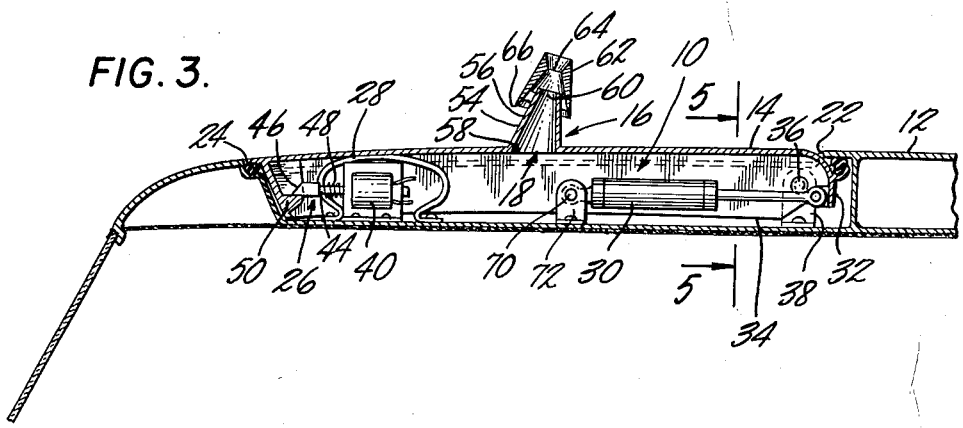
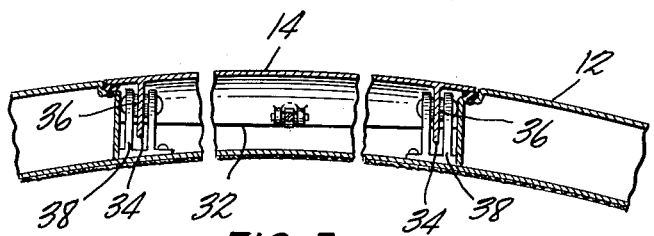
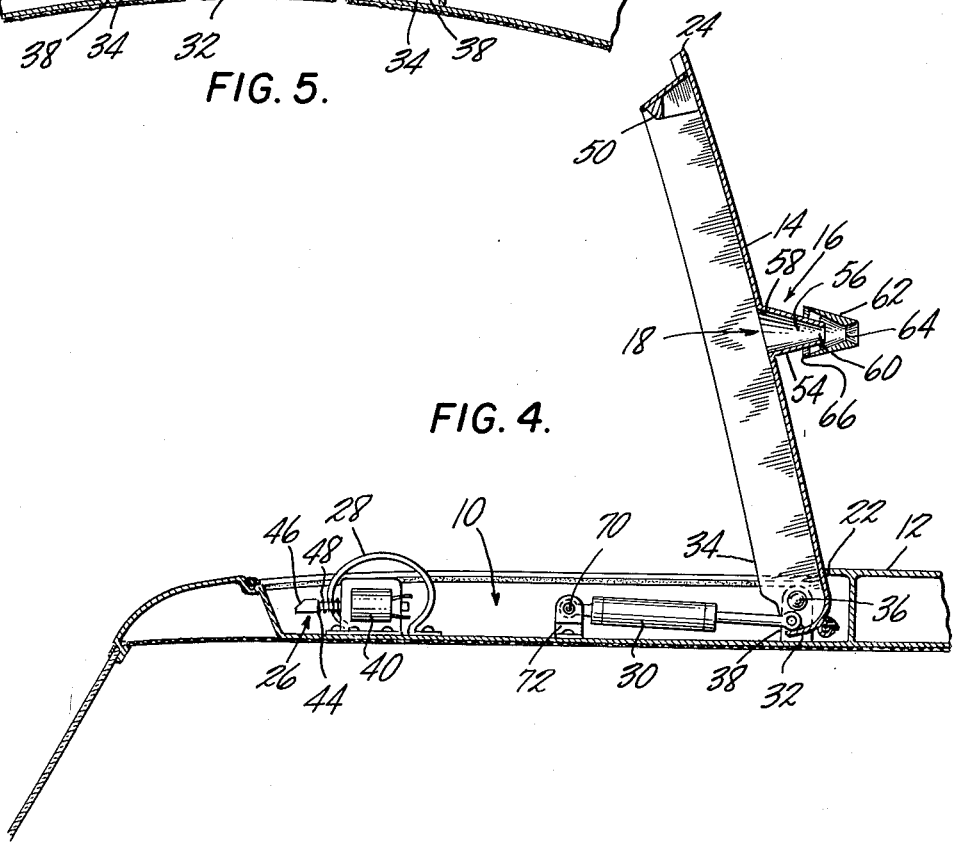

United States Patent Office 2,979,165
Patented Apr. 11, 1961

2,979,165

FLUID-DYNAMIC EMERGENCY BRAKES

Joseph McCambridge, Watson Lane, Setauket, N.Y.

Filed Apr. 7, 1960, Ser. No. 20,615

3 Claims. (Cl. 188—87)

The invention relates to improved fluid-dynamic emergency brakes for high speed vehicles.

Fluid-dynamic brakes are best known to the art in their aerodynamic application as evident by a number of prior patents, for example Daimler-Benz, British Patent No. 720,994, T.J. Byrnes, U.S. Patent No. 2,149,-161, and A. H. Peycke et al. U.S. Patent No. 2,172,567. These inventions seem not to have achieved public acceptance presumably because of their bulk and the large volume storage facilities required therefor, or in lieu thereof, the unsightly open storage as illustrated in the British patent cited. Brakes of this type comprise a braking member that is pivotable about an axis transverse to the direction of travel from a closed inoperative position in which the braking member offers a minimum air resistance to an open operative position in which the braking member offers a maximum resistance to movement in the direction of travel.

It is an object of the invention to provide an improved fluid-dynamic brake that folds within the confines of a vehicle without reducing the size of the present passenger storage areas or increasing the overall dimensions of the vehicle.

Another object of the invention is to provide an improved aerodynamic brake of small size and high braking effect.

Features of the invention are the recessing of the braking member into the vehicle's outer surface. Another feature of the invention is the provision of a device for centering the positive air pressure on the forward braking surface of the braking member and increasing the negative air pressure on the rear braking surface thereby increasing the overall braking power of the braking member without increasing its size.

Other objects and features and a full understanding of the invention may be had by referring to the following description and accompanying drawings in which:

Fig. 3 is an enlarged cross-sectional view taken along lines 3—3 of Fig. 1.

Fig. 4 is an enlarged cross-sectional view taken along lines 4—4 of Fig. 2.

Fig. 5 is a cross-sectional view taken along lines 5—5 of Fig. 3.

Figure 2:
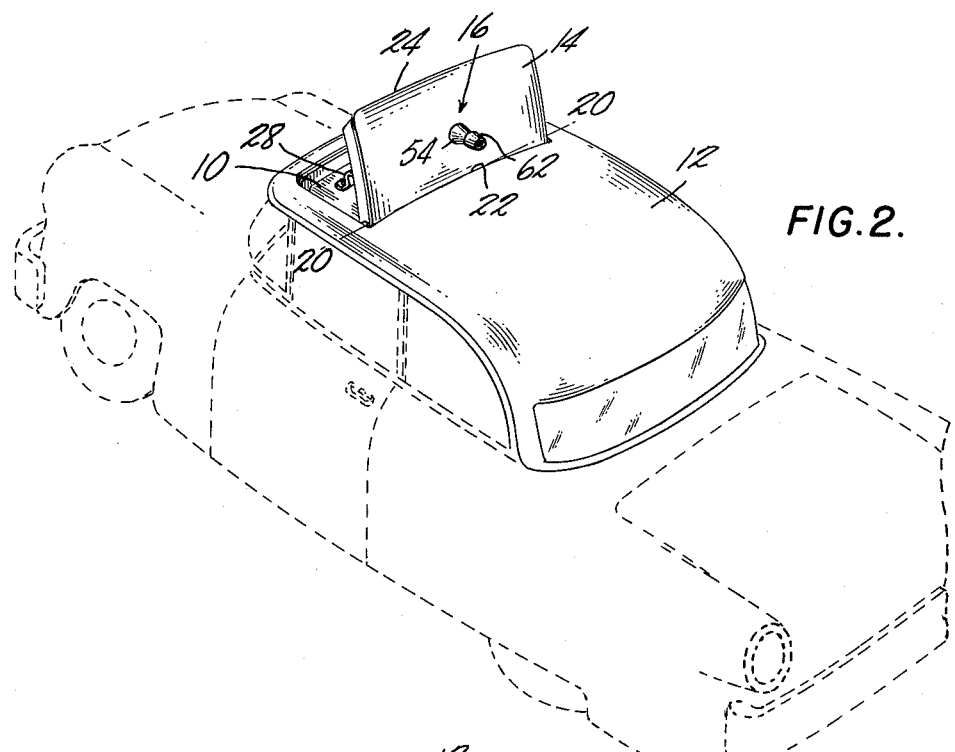
Fig. 2 is a partial perspective plan view from the rear of an auto in which the invention in an open operating condition is incorporated.
Figure 1:
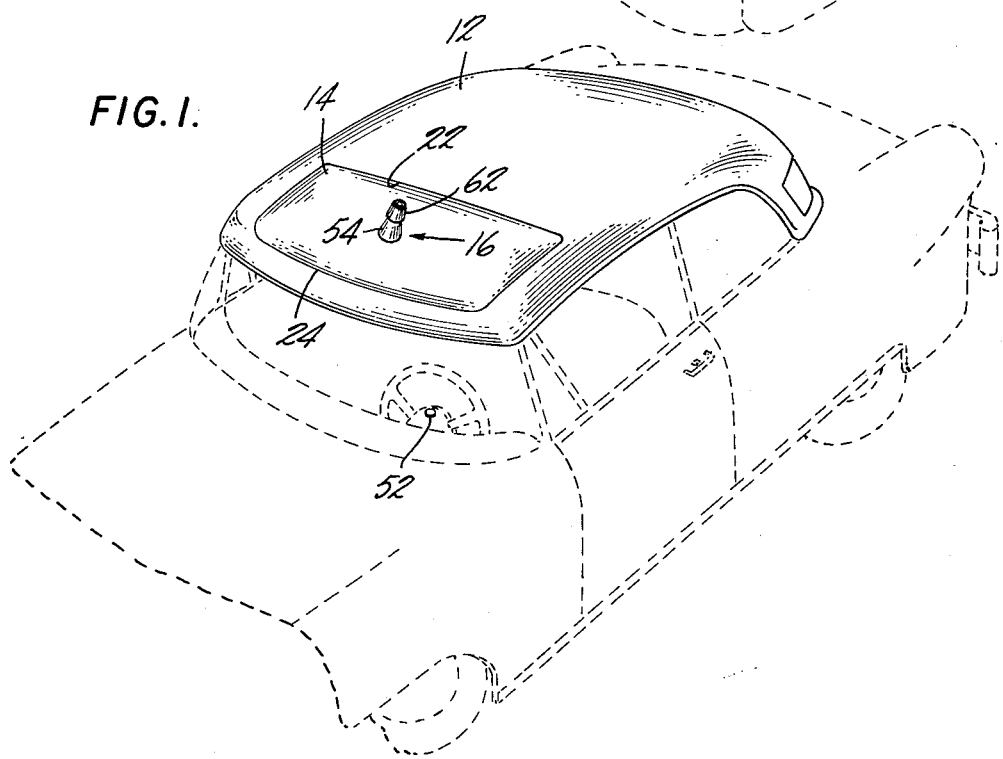
Fig. 1 is a partial perspective plan view from the front of an auto in which the invention in a closed stored condition is incorporated.

Referring to Figs. 1 and 2 the invention is illustrated as mounted in a recess 10 in the front portion of a car roof 12. The invention comprises a four sided braking member 14 that is curved in two planes, or dished, to lie flush with the car roof 12 in a horizontal closed position as shown in Fig. 1. An eductor device 16 is centrally mounted on brake member 14 normal thereto and projecting upward when the brake member 14 is in the closed position. The device is congruent with a hole 18 (see Fig. 4) through the braking member 14.

The braking member 14 is pivotably attached to the car roof 12 at the rear of the recess 10 and opens upward, pivoting about a horizontal axis of rotation 20 adjacent and parallel to the rear edge 22 of the recess 10 to a less than vertical open operating position as illustrated in Fig. 2. The forward edge 24 of the braking member 14 is weighted and releasably secured in the closed position by a latch 26 that will be described in greater detail. Springs 28, on opposite sides of the latch bias the braking member upward to initiate opening the braking member to its open operating position when the latch 26 is tripped. Air pressure then causes the braking member to open to its full operating position. A dash pot 30 (Fig. 3) operatively connected to a rear part 32 of the braking member 14 and the car roof 12 controls the speed of opening and absorbs the opening shock of the braking member 14. After emergency use and the car has been brought to an approximate standstill the braking member returns to an approximate closed position when its weighted forward end exercises a greater turning movement about the axis of rotation 20 than the opposing turning movement of the diminished wind pressure. The latching is accomplished manually.

In greater detail and referring to Figs. 3, 4 and 5, the braking member 14 is pivoted about an axis of rotation 20 transverse the recess 10 by flanges 34 extending normal to the braking member 14 and downward when the braking member is in the closed position. The flanges 34 define holes through which horizontal pivots 36 extend. Vertical lugs 38 attached to and extending upward from the car roof structure in the rear part of the recess 10 engage and support the pivots 36. The rear part of the braking member 14 is thus pivotably secured in the recess 10. The latch 26 comprises a solenoid element 40 attached to the car roof structure in the rcess 10 near the forward edge 24 of the braking member 14 and electrically connected to the car battery for energization. An operating arm 44 of the solenoid 40 terminates in a latch bar 46, extending horizontally toward the forward edge 24, biased by a spring 48 when the solenoid 40 is unenergized to a forward position for engaging a lug 50 defining a latch catch extending rearwardly on the forward edge of recess 10. Cooperation of the latch bar with the latch catch lug holds the braking member in its closed position. A control button conveniently disposed near the car operator, for example on the steering post, is connected in the energizing circuit of the solenoid 40 from the car battery. The button is depressed to close the circuit and energize the solenoid 40 to retract the operating arm 44 and latch bar 46 from engagement with the latch catch lug 50.

The eductor device 16 comprises a hollow tubular member 54, defining a funnel shaped passage 56 with a large end 58 of the passage and a small end having an attached member 62 defining a venturi 64 with a passage 56 but spaced therefrom, the member 62 having an outwardly flaring rear flange 66 extending downwardly of the small end 60 and defining eductor openings 68 extending from in back of the braking surface 14 to the venturi 64. The large end of the funnel shaped member 18 is congruent with a hole 22 (see Fig. 4) through the braking member 14.

The loop springs 28 secured in the forward part of the recess 10 are depressed by the braking member 14 when in the closed latched position and hence biases the forward edge of the member 14 upward when the latch 26 is released. Air pressure generated by the forward motion of the car causes the braking member to pivot upward to its fully opened less than vertical position to brake the car as illustrated in Fig. 4.

The dash pot 30 is attached in the recess 10. An end 70 is horizontally pivoted to a vertical lug 72 attached to the car roof structure 12. The other end of the dash pot is horizontally pivoted to the rear edge of the member 14. The action of a dash pot is too well known to need detailing here. Sufficient to say that the compression of air in the dash pot caused by a piston actuated by the pivoting of the rear edge of the member 14 about its pivots 36 cushions the shock of the air pressure opening the member to its operating braking position. When the braking member 14 is in the open position, the centrally positioned hole 22 centers the pressure on the forward face of the braking member 14 to stabilize the travel of the vehicle. The eductor 16, congruent with the hole 22, utilizes air pressure from in front of the braking member 14 to increase the negative pressure already existing at the back of the braking member caused by the forward travel of the vehicle. The braking action of the brake which is the sum of the positive and negative resistance of the braking member 14 to movement in the direction of travel is thereby increased. This increase in the negative pressure due to the action of the eductor 16 makes possible an increase in braking action with no increase in the size of the braking member 14.

While the invention has been described as attached to a motor car moving through the air on the ground it will be understood that the invention applies equally well with respect to any vehicle moving in any fluid, the only changes being in the number, arrangement and size of the braking members and attached eductors.

Although we have described the invention with a certain degree of particularity it is understood that the present disclosure has been made only by way of example and that numerous changes in details of construction and the combination and arrangement of parts may be resorted to without departing from the spirit and the scope of the invention as hereinafter claimed.

What I desire to secure by Letters Patent is:

1. In a high speed vehicle having an outer surface and traveling in a forward direction and having a fluid dynamic brake with a braking member, said braking member being pivotably attached to said vehicle to rotate from a closed inoperative position parallel with said direction of travel and thereby but slightly increasing the fluid resistance to the travel of said vehicle, to an open operative position less than normal to said direction of travel thereby increasing the fluid resistance to the travel of said vehicle, said braking member in the open position being subjected to a positive fluid pressure on the front of said braking member and a negative pressure on the back, an improved fluid dynamic brake comprising a braking member symmetrically dished to define a center orifice for centering said positive fluid pressure on the front of said braking member and thereby stabilizing the passage of the vehicle through said fluid, and an eductor means secured to said braking member and congruent with said center orifice and extending in the opposite and rearward direction to that in which the vehicle is traveling, said eductor device being activated by fluid pressure from said positive pressure front of the braking member to increase said negative pressure back of said braking member and thereby increasing the total fluid resistance to travel of said vehicle and braking member without increasing the size of said braking member.

2. An improved fluid dynamic brake as described in claim 1 characterized in that said eductor comprises a funnel shaped secured member to said braking member by its large end, and another funnel shaped member forming a venturi with said first member, said other member having an outwardly flaring flange surrounding and outwardly spaced from the end of said first member and connected thereto by struts defining openings leading from in back of said braking member to said venturi.

3. An improved fluid dynamic brake as described in claim 1 characterized in that said braking member in said closed position forms a part of the outer surface of said vehicle flush with the adjacent outer surface of said vehicle.

References Cited in the file of this patent
UNITED STATES PATENTS

| | | |
|---|---|---|
| 1,724,456 | Crook | Aug. 13, 1929 |
| 1,785,775 | Iwanowitz | Dec. 23, 1930 |
| 2,141,984 | Hilmy | Dec. 27, 1938 |
| 2,932,370 | Kraus et al. | Apr. 12, 1960 |